US010229538B2

(12) United States Patent
Sievert

(10) Patent No.: US 10,229,538 B2
(45) Date of Patent: Mar. 12, 2019

(54) SYSTEM AND METHOD OF VISUAL LAYERING

(75) Inventor: Otto K. Sievert, Oceanside, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 227 days.

(21) Appl. No.: 14/126,352

(22) PCT Filed: Jul. 29, 2011

(86) PCT No.: PCT/US2011/045983
§ 371 (c)(1),
(2), (4) Date: Dec. 13, 2013

(87) PCT Pub. No.: WO2013/019190
PCT Pub. Date: Feb. 7, 2013

(65) Prior Publication Data
US 2014/0125704 A1 May 8, 2014

(51) Int. Cl.
G06T 19/00 (2011.01)
G06F 3/01 (2006.01)
G03B 17/54 (2006.01)

(52) U.S. Cl.
CPC ............ G06T 19/006 (2013.01); G03B 17/54 (2013.01); G06F 3/011 (2013.01)

(58) Field of Classification Search
None
See application file for complete search history.

(56) References Cited

U.S. PATENT DOCUMENTS

| 695,460 A | 3/1902 | Jayne |
| 4,986,651 A | 1/1991 | Vanderwerf |
| 5,511,148 A * | 4/1996 | Wellner ............ H04N 1/00381 345/156 |
| 6,067,112 A * | 5/2000 | Wellner ................ G06F 3/033 348/136 |
| 6,431,711 B1 | 8/2002 | Pinhanez |
| 6,840,627 B2 | 1/2005 | Olbrich |
| 6,965,460 B1 | 11/2005 | Gann et al. |
| 7,023,536 B2 | 4/2006 | Zhang et al. |
| 7,038,846 B2 | 5/2006 | Mandella et al. |
| 7,088,440 B2 | 8/2006 | Buermann et al. |
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl et al. |
| 7,268,956 B2 | 9/2007 | Mandella et al. |

(Continued)

FOREIGN PATENT DOCUMENTS

| CN | 101292516 | 10/2008 |
| CN | 101810003 | 8/2010 |

(Continued)

OTHER PUBLICATIONS

Scott R. Klemmer, Katherine M. Everitt, James A. Landay, Integrating Physical and Digital Interactions on Walls for Fluid Design Collaboration, 2008, Human-Computer Interaction, 23(2):138-213.*

(Continued)

Primary Examiner — Michael J Cobb
(74) Attorney, Agent, or Firm — HP Inc. Patent Department

(57) ABSTRACT

A camera identifies a physical object positioned in a workspace. A display displays first digital information into the workspace. A layering module treats the physical object as a first layer in the workspace and treats the first digital information as a second layer in the workspace. A controller controls the visual adjacency of the first and second layers via display of the first digital information.

13 Claims, 6 Drawing Sheets

(56) References Cited

U.S. PATENT DOCUMENTS

| | | | |
|---|---|---|---|
| 7,432,917 B2 | 10/2008 | Wilson et al. | |
| 7,474,809 B2 | 1/2009 | Carl et al. | |
| 7,589,747 B2 | 9/2009 | Matsui et al. | |
| 7,626,578 B2 | 12/2009 | Wilson et al. | |
| 7,729,515 B2 | 6/2010 | Mandella et al. | |
| 7,743,348 B2* | 6/2010 | Robbins | G06F 3/0421 715/767 |
| 7,826,641 B2 | 11/2010 | Mandella et al. | |
| 7,843,470 B2 | 11/2010 | Bannai et al. | |
| 7,959,300 B2 | 6/2011 | Hirahara et al. | |
| 7,961,909 B2 | 6/2011 | Mandella et al. | |
| 9,069,382 B1* | 6/2015 | Starner | G06F 3/038 |
| 2002/0186221 A1 | 12/2002 | Bell | |
| 2003/0035061 A1* | 2/2003 | Iwaki et al. | 348/371 |
| 2003/0092470 A1 | 5/2003 | Kurakane | |
| 2004/0095562 A1 | 5/2004 | Moffatt | |
| 2005/0168437 A1 | 8/2005 | Carl et al. | |
| 2006/0010400 A1 | 1/2006 | Dehlin et al. | |
| 2006/0126128 A1 | 6/2006 | Ahmed et al. | |
| 2007/0008340 A1* | 1/2007 | Endo et al. | 345/633 |
| 2008/0030461 A1 | 2/2008 | Matsui et al. | |
| 2008/0094588 A1 | 4/2008 | James et al. | |
| 2008/0192017 A1 | 8/2008 | Hildebrandt et al. | |
| 2009/0002342 A1* | 1/2009 | Terada et al. | 345/175 |
| 2009/0027337 A1* | 1/2009 | Hildreth | 345/158 |
| 2009/0115721 A1 | 5/2009 | Aull et al. | |
| 2009/0262098 A1 | 10/2009 | Yamada | |
| 2010/0017722 A1 | 1/2010 | Cohen | |
| 2010/0157388 A1 | 6/2010 | Pishdadian et al. | |
| 2010/0188474 A1 | 7/2010 | Robinson et al. | |
| 2010/0259633 A1* | 10/2010 | Kii | G06F 3/038 348/222.1 |
| 2010/0271394 A1 | 10/2010 | Howard | |
| 2010/0299103 A1 | 11/2010 | Yoshikawa | |
| 2010/0315825 A1* | 12/2010 | Kawamura | 362/458 |
| 2011/0025650 A1 | 2/2011 | Jocelyne | |
| 2011/0063256 A1 | 3/2011 | Ye et al. | |
| 2011/0169778 A1 | 7/2011 | Nungester et al. | |
| 2011/0227915 A1 | 9/2011 | Mandella et al. | |
| 2011/0234879 A1* | 9/2011 | Kashitani | G06F 3/011 348/333.02 |
| 2012/0038549 A1 | 2/2012 | Mandella et al. | |
| 2012/0054355 A1* | 3/2012 | Arrasvuori et al. | 709/229 |
| 2012/0069180 A1* | 3/2012 | Kawamura | 348/143 |
| 2013/0034484 A1 | 2/2013 | Zones et al. | |
| 2013/0194418 A1 | 8/2013 | Gonzalez-Banos et al. | |
| 2014/0139717 A1* | 5/2014 | Short | H04N 7/142 348/333.1 |
| 2015/0042678 A1* | 2/2015 | Alt | G06F 3/005 345/633 |

FOREIGN PATENT DOCUMENTS

| | | |
|---|---|---|
| JP | 10222436 | 8/1998 |
| JP | 2003-131319 | 5/2003 |
| JP | 2003-131319 A | 5/2003 |
| JP | 2004192623 | 7/2004 |
| JP | 2004192623 A | 7/2004 |
| JP | 2006-189712 | 7/2006 |
| JP | 2011081556 | 4/2011 |
| KR | 1020110003705 | 1/2011 |
| WO | WO-2007/006051 | 10/2008 |
| WO | WO-2009018161 | 2/2009 |
| WO | WO-2010/137496 A1 | 12/2010 |

OTHER PUBLICATIONS

Bjorn Hartmann, Meredith R. Morris, Hrvoje Benko, Andrew D. Wilson, Augmenting Interactive Tables with Mice and Keyboards, 2009,Proceedings of the 22nd annual ACM symposium on User interface software and technology UIST '09, pp. 149-152.*

Tyler Denis, Superimpose a Car onto Another Image in Photoshop, 2011, retrieved from <<http://designinstruct.com/digital-art/photo-manipulation/superimpose-a-car-onto-another-image-in-photo-shop/>> Accessed Apr. 2, 2015.*

Michael Wooldridge, Chapter 8: Working with Layers, 2009, Teach Yourself Visually Adobe Photoshop CS4, Chapter 8, pp. 168-199, ISBN: 9780470339473.*

Gao, Rui et al; Microsoft Research—Mobile Surface; Microsoft Research; 2010; http://research.microsoft.com/en-us/projects/mobilesurface/.

Hand, Randall; Infinite Z Launches zSpace Virtual Holographic 3D Display for Designers; VizWorld.com; Dec. 13, 2011; http://www.vizworld.com/2011/12/infinite-launches-zspace-virtual-holographic-3d-display-designers/#sthash.j6Ys61PX.dpbs.

Harrison, Beverly & Ziola, Ryder; Bringing Toys to Life: Intel Labs OASIS Project; Augmented Engineering; Jan. 26, 2011; http://augmentedengineering.wordpress.com/2011/01/26/bringing-toys-to-life-intel-labs-oasis-project/.

Harrison, Chris et al; OmniTouch: Wearable Multitouch Interaction Everywhere; UIST'11; Oct. 16, 2011; Santa Barbara, California; http://research.microsoft.com/en-us/um/people/awilson/publications/HarrisonUIST2011/HarrisonUIST2011.html.

Hartmann, Bjorn et al; Pictionaire: Supporting Collaborative Design Work by Integrating Physical and Digital Artifacts; CSCW 2010; Feb. 6, 2010; Savannah, Georgia; http://research.microsoft.com/en-us/um/people/awilson/publications/HartmannCSCW2010/HartmannCSCW2010.html.

Hinckley, Ken et al; Pen + Touch = New Tools; UIST'10; Oct. 3, 2010; New York, New York; http://research.microsoft.com/en-us/um/people/awilson/publications/HinckleyUIST2010/HinckleyUIST2010.html.

Izadi, Shahram et al; C-Slate: A Multi-Touch and Object Recognition System for Remote Collaboration Using Horizontal Surfaces; IEEE; 2007; http://research.microsoft.com/pubs/132551/cslate1.pdf.

Kane, S.K. et al., Bonfire: a Nomadic System for Hybrid Laptop-tabletop interaction, (Research Paper), Oct. 4-7, 2009, pp. 129-138.

Kane, Shaun K. et al; Bonfire: A Nomadic System for Hybrid Laptop-Tabletop Interaction; UIST'09; Oct. 4, 2009; Victoria, British Columbia, Canada; http://dub.washington.edu/djangosite/media/papers/uist09.pdf.

Linder, Natan et al; LuminAR: Portable Robotic Augmented Reality Interface Design and Prototype; UIST'10, Oct. 3, 2010; New York, New York; http://fluid.media.mit.edu/sites/default/files/2010-10-03-luminar_uist10_demo.pdf.

Melanson, Donald; Microsoft Research Working on Portable Surface; Mar. 2, 2010: http://www.engadget.com/2010/03/02/microsoft-research-working-on-portable-surface/.

Melanson, Donald; Wiimote Repurposed for Multi-Point Interactive Whiteboard; Dec. 10, 2007; http://www.engadget.com/2007/12/10/wiimote-repurposed-for-multi-point-interactive-whiteboard/.

Simonite, Tom; A Kitchen Countertop With a Brain; MIT Technology Review; Jul. 2, 2010; http://www.technologyreview.com/news/419639/a-kitchen-countertop-with-a-brain/.

Wilson, Andrew D. et al; Combining Multiple Depth Cameras and Projectors for Interactions on, Above, and Between Surfaces; USTI'10; Oct. 3, 2010; New York, New York; http://research.rnicrosoft.com/en-us/um/people/awilson/publications/WilsonUIST2010/WilsonUIST2010.html.

Wilson, Andrew D.; Using a Depth Camera as a Touch Sensor; ITS 2010: Devices & Algorithms; Nov. 7, 2010; Saarbrucken, Germany; http://research.microsoft.com/en-us/um/people/awilson/publications/WilsonITS2010/WilsonITS2010.html.

Yuanyuan Ding et al; Catadioptric Projectors; http://www.eecis.udel.edu/~jye/lab_research/09/cprojector.pdf.

International Search Authority Search Report, dated Feb. 20, 2012. PCT Application No. PCT/US2011/045983. Filing Date Jul. 29, 2011.

Anton Fuhrmann et al., "Occlusion in Collaborative Augmented Environments," Computers & Graphics, vol. 23, No. 6, Dec. 1, 1999, pp. 809-819, Elsevier Science, Ltd.

(56) References Cited

OTHER PUBLICATIONS

Daniel Kurz et al., "Mutual Occlusions on Table-top Displays in Mixed Reality Applications," VRST '88, 1988, pp. 1-4, New York, New York, USA.
Extended European Search Report, EP Application No. 11870359.4, dated Apr. 23, 2015, pp. 1-6.
Ramesh Raskar et al., "The Office of the Future: A Unified Approach to Image-Based Modeling and Spatially Immersive Displays," SIGGRAPH '98, Jul. 19-24, 1998, Orlando, Florida, USA, pp. 1-10.
Sasa Junuzovic et al., Microsoft Research, IllumiShare, 2012, pp. 1-2, Microsoft.

\* cited by examiner

SYSTEM AND METHOD OF VISUAL LAYERING

BACKGROUND

Sharing digital information and collaborating based on that digital information is becoming increasingly common. Input devices capture digital information (e.g., user input on a computing device, digital cameras, scanning devices, etc.). Output devices output digital information for consumption by a user or group of users. Output devices may include digital displays or digital projectors that display digital information onto a display screen or into a workspace.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Embodiments described herein relate to a projection-capture system. The combination of projection, capture and user input control in the same workspace at the same time facilitates mixed reality (i.e., physical and virtual) collaboration. For example, virtual objects could be files on a user's computer (e.g., electronic presentation slides, electronic documents, digital photos, etc). Physical objects could be two-dimensional objects (e.g., photos, documents, etc.) or three-dimensional objects (e.g., models, widgets, etc.). As described herein, physical and virtual objects are treated as visually interchangeable "layers." As described herein, these layers represent logical layers and allow systems and devices described herein to control the workspace environment such that one layer (e.g., physical object or set of digital information) has the appearance of being on top of another layer. In a collaborative environment where users in different locations collaborate via separate projection-capture systems, each user is able see and interact with both the local and remote objects (physical and virtual) because the camera on each system sends a live (e.g., video) feed to the other location for projection.

Figure 1:
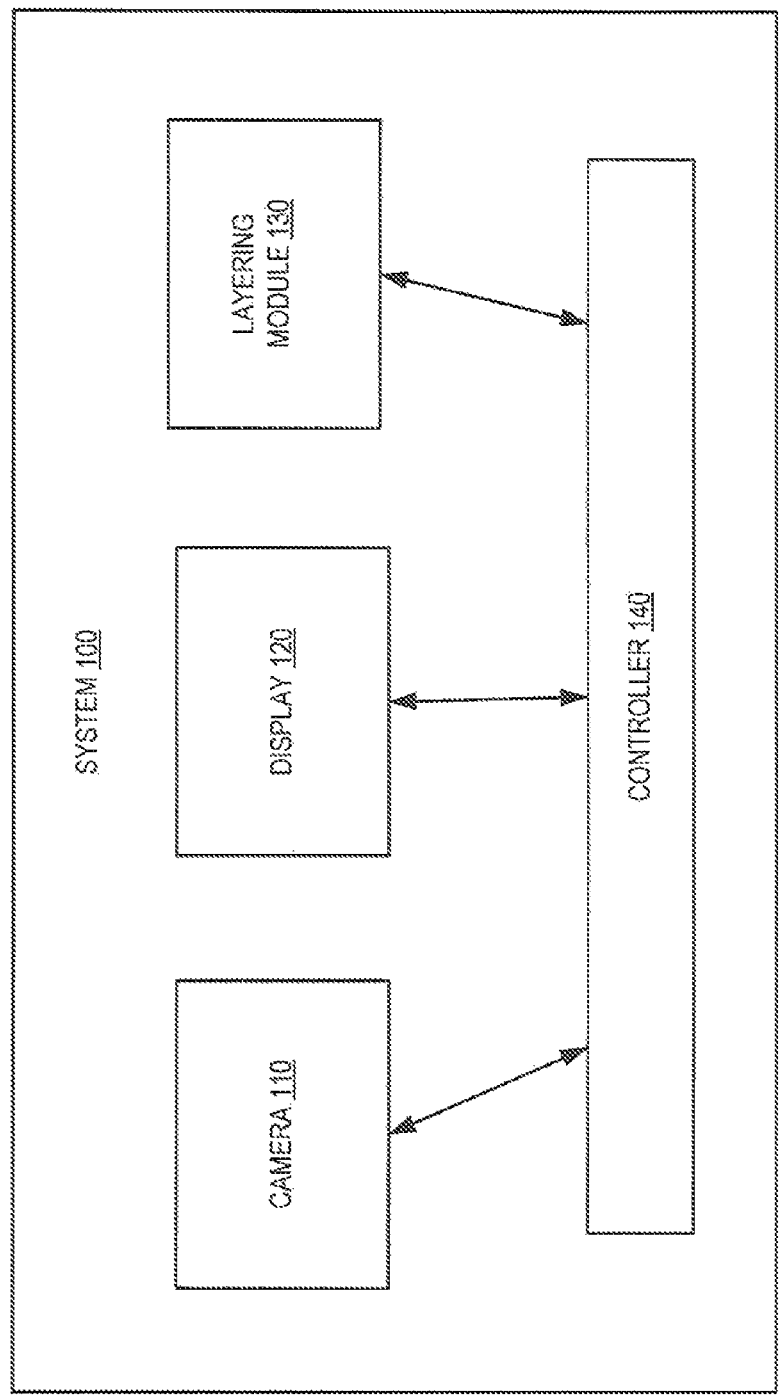
FIG. 1 is a block diagram illustrating a system according to various embodiments.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these. Various modules and/or components illustrated in FIG. 1 may be implemented as a computer-readable storage medium containing instructions executed by a processor and stored in a memory for performing the operations and functions discussed herein.

System 100 includes a camera 110, a display 120, a layering module 130 and a controller 140. Camera 110, display 120 and layering module 130 are operatively connected to controller 140 to facilitate altering visual adjacency between layers in a workspace. In an example, display 120 displays a map onto a work-surface. Display 120 could be a display screen placed onto a work-surface or it could be a digital projector that displays information on the work-surface via digital projection. Additionally, camera 110 detects a physical object (e.g., a model of a house or building) placed on the work-surface. Camera 110 could be a visible-light camera (e.g., digital image camera, a digital video camera, etc.) or an infrared (IR) camera.

Layering module 130 associates the physical object with one visual layer and associates the projected map with another visual layer. By maintaining state information for the various layers, controller 140 is able to control the visual adjacency of the layers. In other words, one layer may initially appear to be "on top of" the other layer, but controller 140 may alter the visual adjacency such that the "bottom" layer visually becomes the "top" layer.

Figure 2:
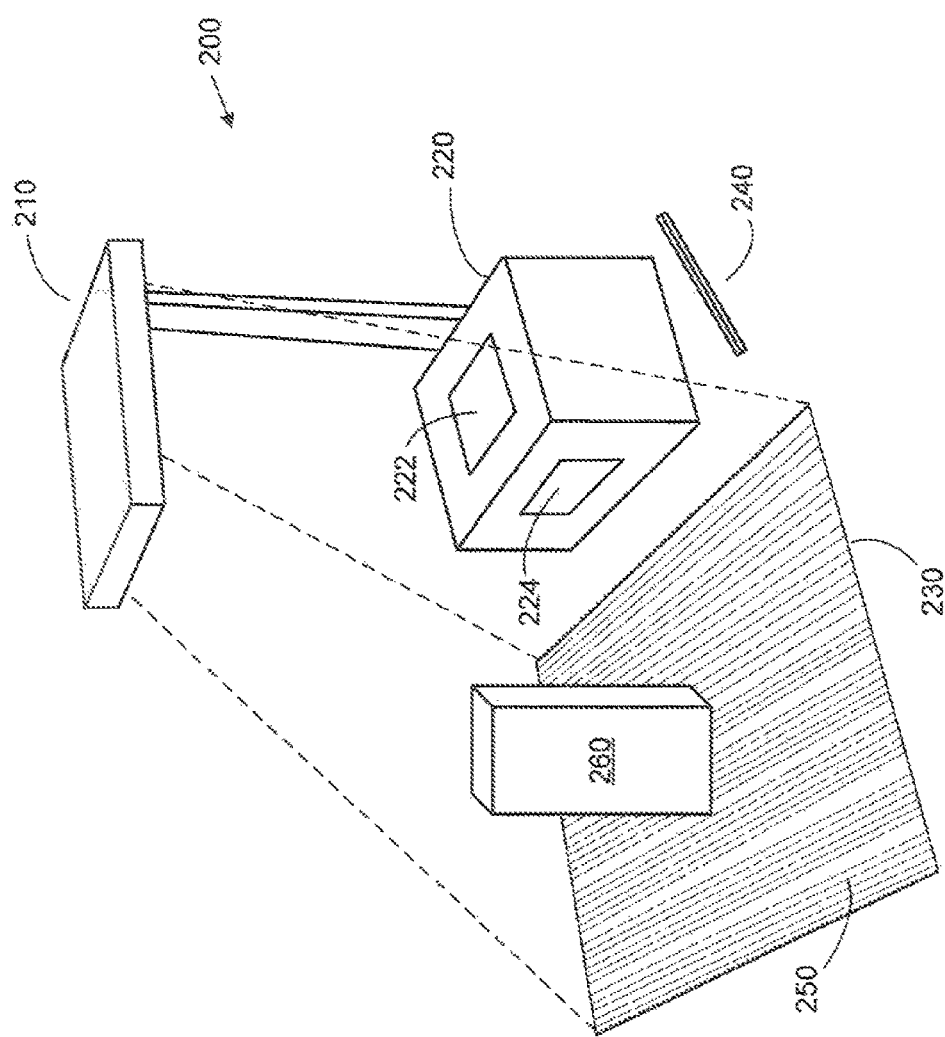
FIG. 2 is a perspective, exterior view illustrating a system according to various embodiments.
Figure 3:
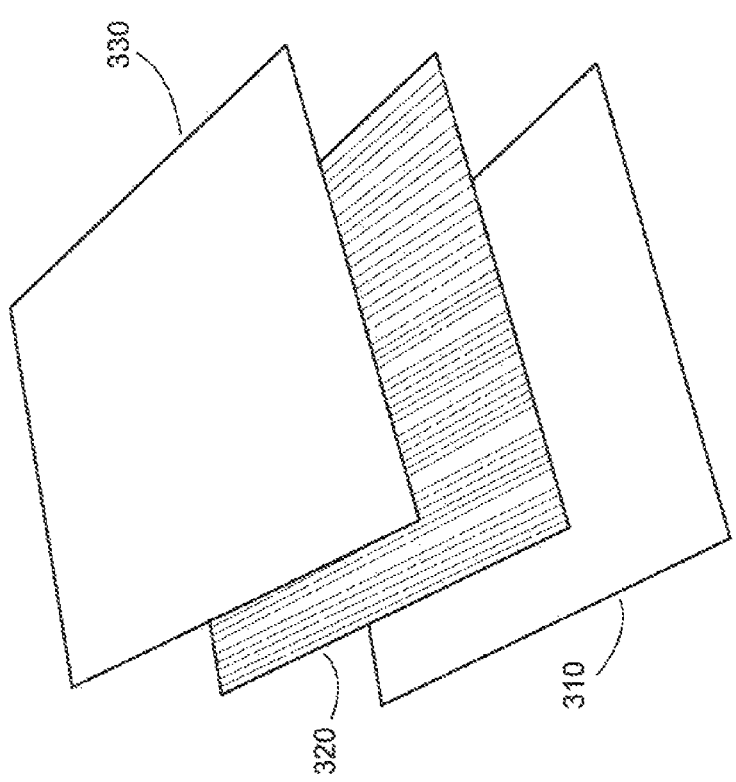
FIG. 3 is a perspective view illustrating logical layers in a system according to various embodiments.

FIGS. 2-3 are perspective, exterior views illustrating a system according to various embodiments. FIGS. 2-3 include particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

System 200 includes a top 210 and a base 220. Base 220 includes an infrared (IR) camera 224 and a projector 222, along with housing other components (e.g., processor, memory, layering module, controller, etc.). Projector 222 may be any suitable light projector including, but not limited to, LED (laser emitting diode) and DLP (digital light processing) projection. In various embodiments, projector 222 projects digital information toward top 210 where a mirror reflects the projection onto work-surface 230. IR camera 224 detects the position of physical objects positioned on work-surface 230.

Projector 222 projects a projection 250 of digital information (e.g., lines) onto work-surface 230. Object 260 is a physical object placed in workspace 230. IR camera 224 detects the position of the object 260. A layering module (e.g., layering module 130) associates projection 250 with one logical layer and object 260 with another logical layer. As shown in FIG. 2, object 260 appears to be "on top of"

projection 250. In other words, object 260 appears to be a foreground layer while projection 250 appears to be a background layer.

FIG. 3 illustrates the logical layers described above. Layer 310 represents work-surface 230. Layer 320 represents projection 250 and is, in this example, "on top of" layer 310. Layer 330 represents object 260 and is, in this example, "on top of" layer 320. Once objects and digitally projected information have been associated with logical layers, the layering module maintains state information about the visual order of the layers.

System 200 also includes a user input device 240 that allows the user to interact with system 200. In various embodiments, user input (UI) device 240 includes an infrared digital stylus and/or infrared camera to detect the position of UI device 240 in workspace 230. Although any suitable UI device may be used, a digital stylus has the advantage of allowing input in three dimensions, including along the surface of workspace 230, without a sensing pad or other special surface. Thus, system 200 can be used on a variety of work-surfaces.

User input received from UI device 240 or other input mechanism may indicate a request to alter the visual adjacency of layers in workspace 230. For example, touching object 260 with UI device 240 may indicate a request to have object 260 be the foreground layer, with projection 250 as the background layer. Touching the surface of workspace 230 might indicate a request to have projection 250 be the foreground layer, with object 260 as the background layer. System 200 can use this input and state information from the layering module to alter the projection from projector 222 such that the visual order of the layers is altered (e.g., foreground and background layers are swapped).

Figure 4:
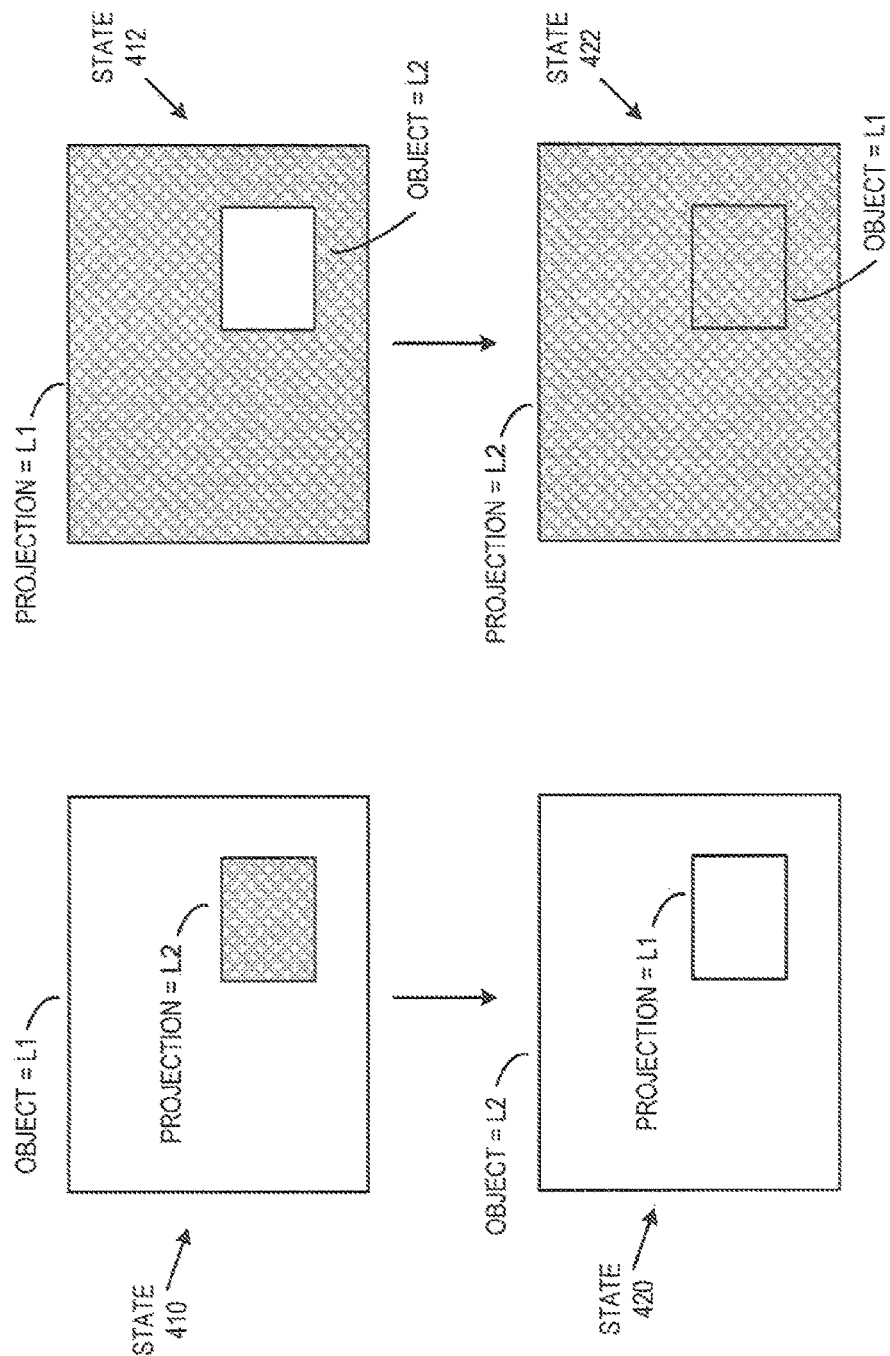
FIG. 4 is a block diagram illustrating layer states in a system according to various embodiments.

FIG. 4 is block diagram illustrating state changes for layers (real and virtual) in a projection-capture system. For illustrative purposes, the surface of the workspace on which objects are positioned and digital information is projected is considered layer L0. Thus, a layer L1 would be visually adjacent (e.g., "on top of") layer L0 and a layer L2 would be visually adjacent (e.g., "on top of") layer L1. As shown, state 410 includes a physical object (e.g., a map, document, other two-dimensional or three-dimensional object, etc.) associated with layer L1. In other words, the physical object is visually adjacent L0. A projection of digital information (e.g., image, document, etc.) is initially associated with layer L2 and is visually adjacent layer L1. Thus, in state 410, the projection of digital information visually appears to the system user as being "on top of" the physical object.

In response to user input or other control signal to alter the visual adjacency of the layers, the system layering module changes the layer associations from those of state 410 to those of state 420. In state 420, the physical object becomes layer L2 and the projection of digital information becomes layer L1. To create the visual appearance of the physical object being "on top of" the projection, the system may simply stop projecting the digital information into the workspace.

State 412 includes a projection of digital information (e.g., a map, document, image, etc.) initially associated with layer L1. In other words, the projection is visually adjacent L0. A physical object (e.g., two-dimensional or three-dimensional) is initially associated with layer L2 and is visually adjacent layer L1. To achieve the visual appearance of physical object being "on top of" the projection, the system may remove the digital information (e.g., map or image data, etc.) corresponding to the coordinates of the physical object from the projection. For example, at the position where the physical object is located, the system may project a blank space (e.g., white or other suitable-colored light) while still projecting the original digital information (e.g., map or image data, etc.) at all other positions in the workspace. Alternatively, the system may capture a digital image of the physical object (e.g., from directly above the physical object) and project that image at the position where the physical object is located (in lieu of projecting a blank space). In either example, the effect is the appearance of the physical object being "on top of" of the projected digital information.

In response to user input or other control signal to alter the visual adjacency of the layers, the system layering module changes the layer associations from those of state 412 to those of state 422. In state 422, the physical object becomes layer L1 and the projection of digital information becomes layer L2. To create the visual appearance of the projected digital information being "on top of" the physical object, the system may simply project all of the digital information into the workspace including at the position where the physical object is located.

It should be noted that multiple projection-capture systems may be used in remote locations for virtual collaboration. The states depicted in FIG. 4 illustrate an example of such collaboration. The user in the first location might have a physical object and a projection according to state 410. At the same time, the user in the second location might have a physical object and a projection according to state 412. In other words, system represented by state 410 may capture a digital image of the physical object and send it to the collaborating system, where the digital image is projected according to state 412. Likewise, the user in the second location has a physical object according to state 412. This physical object is also captured digitally and sent to the other system, shown as the projection in state 410. In this way, system users in different locations may collaborate using both real and virtual objects.

Figure 5:
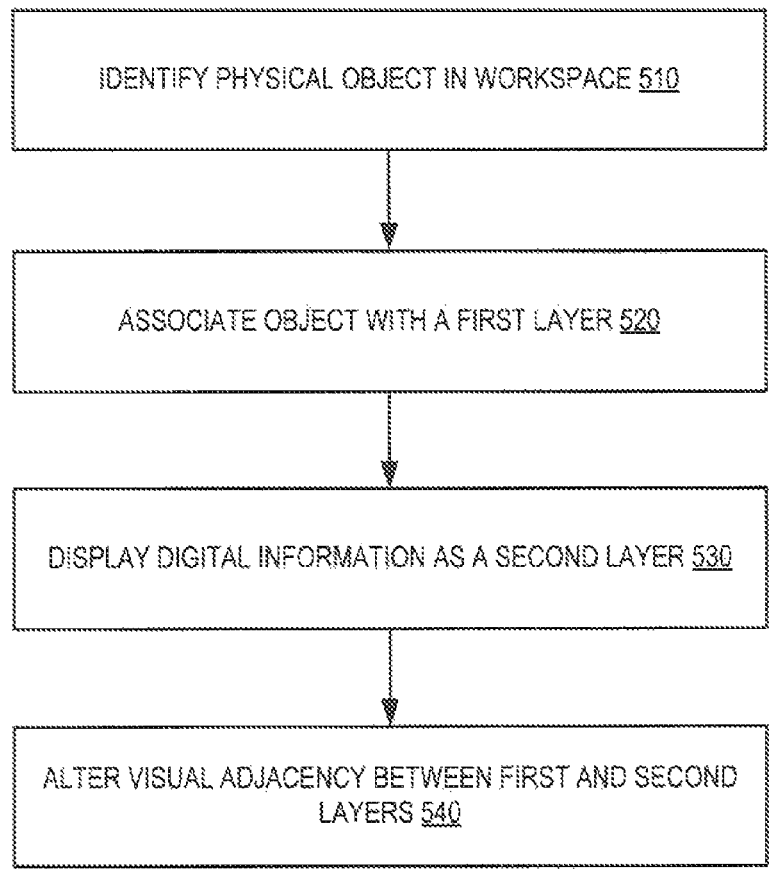
FIG. 5 is a flow diagram of operation in a system according to various embodiments.

FIG. 5 is a flow diagram of operation in a system according to various embodiments. FIG. 5 includes particular operations and execution order according to certain embodiments. However, in different embodiments, other operations, omitting one or more of the depicted operations, and/or proceeding in other orders of execution may also be used according to teachings described herein.

A system identifies 510 a physical object in a workspace. The physical object can be two-dimensional or three-dimensional. Objects may be identified by a camera (e.g., infrared, digital image capture, digital video, etc.). In various embodiments, identification includes determining a position (e.g., coordinates) of the object within the workspace. A layering module associates 520 the physical object with a first layer. The system also displays (e.g., projects) 530 digital information (e.g., an image) as a second layer into the workspace. Again, the layering module maintains the association between the projected information and the second layer.

The system, perhaps in response to user input, alters 540 the visual adjacency between the first and second layers. For example, the first layer might initially be visually adjacent (e.g., appears to be "on top of") the surface of the workspace. The second layer might initially be visually adjacent (e.g., appears to be "on top of") the first layer. In response to a user request or other control signal, the system switches the visual order of the layers. Thus, the second layer becomes visually adjacent the surface of the workspace while the first layer becomes visually adjacent the second layer.

Figure 6:
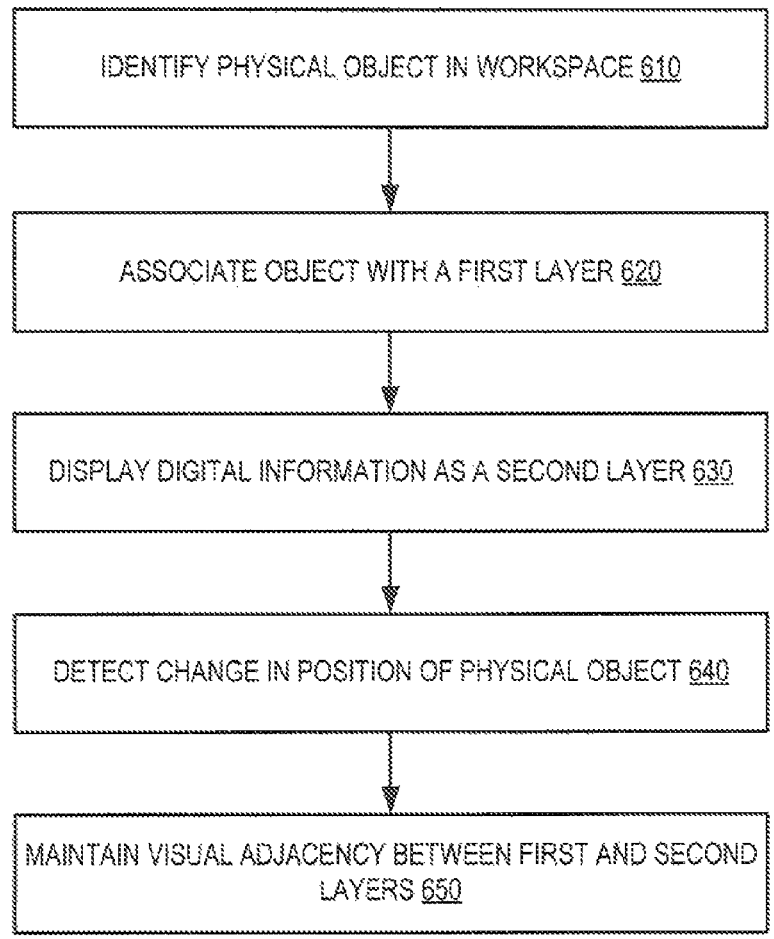
FIG. 6 is a flow diagram of operation in a system according to various embodiments.

FIG. 6 is a flow diagram of operation in a system according to various embodiments. FIG. 6 includes particular operations and execution order according to certain embodiments. However, in different embodiments, other operations, omitting one or more of the depicted operations, and/or proceeding in other orders of execution may also be used according to teachings described herein.

A projection-capture system identifies 610 a physical object in a workspace. Again, the physical object can be two-dimensional or three-dimensional. Objects may be identified by a camera (e.g., infrared, digital image capture, digital video, etc.). A system layering module associates 620 the physical object with a first layer. The system also displays (e.g., projects) 630 digital information (e.g., an image) as a second layer into the workspace. Again, the layering module maintains the association between the projected information and the second layer.

The system detects 640 a change in the position of the physical object. For example, the system may include an infrared camera or a visible-light camera (e.g., digital still-image camera or a digital video camera) for detecting the position of the physical object. In response to detecting the change in position of the physical object, the system maintains 650 the visual adjacency between the first and second layers. For example, if a workspace is logically divided into four quadrants, a physical object might initially be detected as occupying the first quadrant. If the physical object (associated with one layer) is initially visually "on top of" projected digital information (associated with a different layer), then the system may abstain from projecting the digital information that would otherwise be located in the first quadrant, consistent with the visual order of the layers. However, in response to defecting movement of the physical object from the first quadrant to the second quadrant, the system may then project the digital information associated with the first quadrant while removing from the projection the digital information associated with the second quadrant, thereby maintaining the appearance that the physical object is "on top of" the projected digital information.

In examples described herein, methods and systems manage the visual adjacency of first and second layers. The methods and systems described herein are readily extendible to more than two layers. For example, additional layers of projected digital information could be managed by a projection capture system. Also, additional physical objects could each be associated with a distinct layer. The visual adjacency between these multiple physical and projected layers may be managed according to the embodiments described herein.

Various modifications may be made to the disclosed embodiments and implementations of the invention without departing from their scope. Therefore, the illustrations and examples herein should be construed in an illustrative, and not a restrictive sense.

What is claimed is:

1. A system, comprising:
a camera to identify a physical object positioned in a three-dimensional workspace;
a display to display first digital information in the workspace;
a processor;
a memory to store instructions that, when executed by the processor, cause the processor to:
treat the physical object as a first layer of a plurality of depth ordered visual layers in the workspace and treat the first digital information as a second layer of the plurality of depth ordered visual layers in the workspace, wherein the plurality of depth ordered visual layers comprises a foreground layer and a background layer, and the first layer comprises a projected image of the physical object;
control the visual order of the first and second layers via display of the first digital information;
receive user input, within the workspace, representing physical interaction with at least one of the physical object or a surface of the workspace to indicate a change in the visual order of the first and second layers; and
alter the visual order of the first and second layers in response to the user input, wherein altering the visual order comprises one of changing the visual order of the first and second layers so that the first layer is behind the second layer, or changing the visual order of the first and second layers so that the first layer is in front of the second layer.

2. The system of claim 1, wherein the camera is at least one of an infrared camera or a visible-light camera.

3. The system of claim 1, wherein the instructions, when executed by the processor, cause the processor to alter the display of the first digital information to maintain an existing visual order between the first and second layers in response to a change in position of the physical object relative to the first digital information.

4. The system of claim 1, wherein:
the display to display second digital information in the workspace;
the instructions, when executed by the processor, cause the processor to treat the second digital information as a third layer in the workspace; and
the instructions, when executed by the processor, cause the processor to control display of the first and second digital information to alter the visual order between the first, second, and third layers.

5. The system of claim 1, wherein the display comprises a digital projector.

6. A computer-readable non-transitory storage medium containing instructions that, when executed, cause a computer to:
use a camera to identify a physical object positioned in a three-dimensional workspace;
associate the physical object with a first layer of a plurality of depth ordered visual layers comprising a foreground layer and a background layer, wherein the first layer comprises a projected image of the physical object;
display digital information as a second layer of the plurality of depth ordered visual layers in the workspace;
receive user input, within the workspace, representing physical interaction with at least one of the physical object or a surface of the workspace to indicate a change in the visual order of the first and second layers; and
alter the visual adjacency between the first and second layers in response to the user input, wherein altering the visual adjacency between the first and second layers comprises one of changing the visual adjacency of the first and second layers so that the first layer is behind the second layer or changing the visual adjacency of the first and second layers so that the first layer is in front of the second layer.

7. The computer-readable storage medium of claim 6, comprising further instructions that cause the computer to:

maintain an existing visual adjacency between the first and second layers in response to a change in position of the physical object relative to the displayed digital information.

8. The computer-readable storage medium of claim 6, comprising further instructions that cause the computer to:
   display additional digital information as a third layer in the workspace; and
   alter the visual adjacency between the first, second, and third layers.

9. A method for a projector-camera system, comprising:
   using a camera to identify a physical object positioned in a three-dimensional workspace;
   associating the physical object with a first layer of a plurality of depth ordered visual layers comprising a foreground layer and a background layer, wherein the first layer comprises a projected image of the physical object;
   projecting digital information as a second layer of the plurality of depth ordered visual layers into the workspace;
   receiving user input, within the workspace, representing physical interaction with at least one of the physical object or a surface of the workspace to indicate a change in the visual order of the first and second layers; and
   altering the visual adjacency between the first and second layers in response to the user input, wherein altering the visual adjacency between the first and second layers comprises one of changing the visual adjacency of the first and second layers so that the first layer is behind the second layer or changing the visual adjacency of the first and second layers so that the first layer is in front of the second layer.

10. The method of claim 9, further comprising using infrared sensing to identify the physical object.

11. The method of claim 9, wherein the digital information comprises a digital image or digital video feed.

12. The method of claim 9, further comprising:
   maintaining an existing visual adjacency between the first and second layers in response to a change in position of the physical object relative to the projected digital information.

13. The method of claim 9, further comprising:
   projecting additional digital information as a third layer into the workspace; and
   altering the visual adjacency between the first, second, and third layers.

* * * * *